(12) United States Patent
Nakano et al.

(10) Patent No.: US 10,496,079 B2
(45) Date of Patent: Dec. 3, 2019

(54) CONTROL DEVICE AND CONTROL METHOD

(71) Applicant: OMRON Corporation, Kyoto (JP)

(72) Inventors: Masahiko Nakano, Ritto (JP); Eiji Yamamoto, Kyoto (JP); Tetsushi Jakunen, Kusatsu (JP)

(73) Assignee: OMRON Corporation, Kyoto (JP)

( * ) Notice: Subject to any disclaimer, the term of this patent is extended or adjusted under 35 U.S.C. 154(b) by 72 days.

(21) Appl. No.: 15/894,929

(22) Filed: Feb. 13, 2018

(65) Prior Publication Data

US 2019/0079500 A1 Mar. 14, 2019

(30) Foreign Application Priority Data

Sep. 14, 2017 (JP) .................... 2017-176477

(51) Int. Cl.
| | |
|---|---|
| *G06F 3/00* | (2006.01) |
| *G05B 19/418* | (2006.01) |
| *G05B 19/408* | (2006.01) |
| *G05B 19/05* | (2006.01) |

(52) U.S. Cl.
CPC ....... *G05B 19/41835* (2013.01); *G05B 19/05* (2013.01); *G05B 19/408* (2013.01); *G05B 2219/1105* (2013.01); *G05B 2219/1134* (2013.01); *G05B 2219/31418* (2013.01)

(58) Field of Classification Search
CPC ................................................ G05B 19/41835
USPC ........................................................ 719/312
See application file for complete search history.

(56) References Cited

U.S. PATENT DOCUMENTS 5,984,499 A    11/1999 Nourse et al.

FOREIGN PATENT DOCUMENTS

| JP | 2012194662 | 10/2012 |
| JP | 2013134786 | 7/2013 |

OTHER PUBLICATIONS

"Search Report of Europe Counterpart Application", dated Aug. 24, 2018, p. 1-p. 8.

*Primary Examiner* — Timothy A Mudrick
(74) *Attorney, Agent, or Firm* — JCIPRNET

(57) ABSTRACT

An environment for easily executing a plurality of types of programs in cooperation with each other is provided. A control device includes: a first program executing unit that executes a sequence program for each first control cycle and calculates a first instruction value; a second program executing unit that executes an application program which is described in codes which are sequentially interpreted and calculates a second instruction value for each first control cycle; and a shared memory configured to be accessible by both the first program executing unit and the second program executing unit. The second program executing unit executes the application program while referring to the first shared variable value stored in the shared memory in accordance with the codes described in the application program.

19 Claims, 9 Drawing Sheets

CONTROL DEVICE AND CONTROL METHOD

CROSS-REFERENCE TO RELATED APPLICATION

This application claims the priority of Japan patent application serial no. 2017-176477, filed on Sep. 14, 2017. The entirety of the above-mentioned patent application is hereby incorporated by reference herein and made a part of this specification.

BACKGROUND

Technical Field

The disclosure relates to a control device and a control method that control a control object.

Description of Related Art

In various production fields, factory automation (FA) technology using a control device such as a programmable logic controller (PLC) has spread widely. Such a control device may indirectly control a control object by issuing a control instruction to another device as well as directly controlling a control object. For example, Japanese Patent Application Laid-open No. 2013-134786 (Patent Document 1) discloses a system including a machine tool and a programmable logic controller connected to the machine tool.

On the other hand, with recent advancement in information and communication technology (ICT), the processing capacity of control devices has rapidly improved. There is demand for incorporation of a control system, which has been implemented using a plurality of dedicated devices in the related art, into a smaller number of control devices. For example, Japanese Patent Application Laid-open No. 2012-194662 (Patent Document 2) discloses a configuration in which a motion calculating program and a user program are synchronously executed in a CPU unit of a PLC. With the configuration disclosed in Japanese Patent Application Laid-open No. 2012-194662 (Patent Document 2), it is possible to execute a user program such as a sequence program and a motion calculating program in cooperation and in synchronization with each other.

SUMMARY

A control device according to an embodiment of the disclosure includes: a first program executing unit that executes a sequence program for each first control cycle and calculates a first instruction value; a second program executing unit that executes an application program which is described in codes which are sequentially interpreted and calculates a second instruction value for each first control cycle; and a shared memory configured to be accessible by both the first program executing unit and the second program executing unit. The first program executing unit writes a first shared variable value which is used in the course of execution of a program to the shared memory in accordance with a command included in the sequence program. The second program executing unit executes the application program while referring to the first shared variable value stored in the shared memory in accordance with the codes described in the application program.

According to another embodiment of the disclosure, there is provided a control method of a control device. The control method includes: a step of executing a sequence program for each first control cycle and calculating a first instruction value; and a step of executing an application program which is described in codes which are sequentially interpreted and calculating a second instruction value for each first control cycle. The control device includes a shared memory configured to be accessible by both an execution entity of the sequence program and an execution entity of the application program. The step of calculating the first instruction value includes a step of writing a first shared variable value which is used in the course of execution of a program to the shared memory in accordance with a command included in the sequence program. The step of calculating the second instruction value includes a step of executing the application program while referring to the first shared variable value stored in the shared memory in accordance with the codes described in the application program.

DESCRIPTION OF THE EMBODIMENTS

Figure 1:
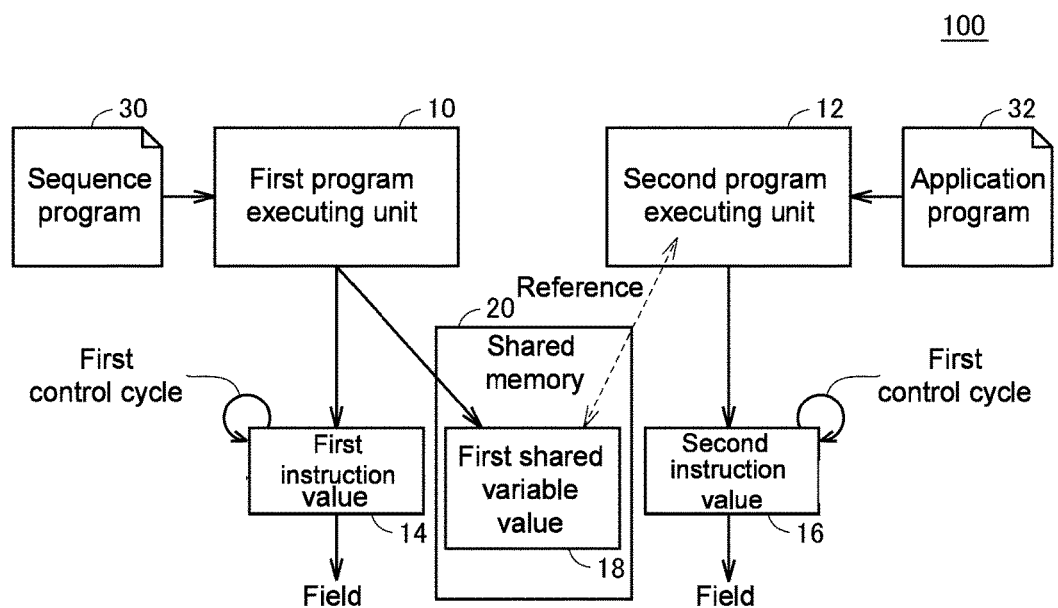
FIG. 1 is a diagram schematically illustrating an example of a situation in which a control device according to an embodiment is applied.

Embodiments of the invention will be described below in detail with reference to the accompanying drawings. The same or corresponding elements in the drawings will be referenced by the same reference signs and description thereof will not be repeated.

It can be assumed that demand for implementation of a control operation based on a plurality of types of program having different execution forms using a single control device will increase. In executing a plurality of types of program using a single control device, it may be necessary to execute programs in cooperation with each other. An embodiment of the disclosure provides an environment for easily executing programs of a plurality of types in cooperation with each other.

A control device according to an embodiment of the disclosure includes: a first program executing unit that executes a sequence program for each first control cycle and calculates a first instruction value; a second program executing unit that executes an application program which is described in codes which are sequentially interpreted and calculates a second instruction value for each first control cycle; and a shared memory configured to be accessible by both the first program executing unit and the second program executing unit. The first program executing unit writes a first shared variable value which is used in the course of execution of a program to the shared memory in accordance with a command included in the sequence program. The second program executing unit executes the application program while referring to the first shared variable value stored in the shared memory in accordance with the codes described in the application program.

According to this disclosure, it is possible to easily execute a sequence program and an application program in cooperation with each other by using writing and reference to a first shared variable value which is stored in the shared memory.

In this disclosure, the second program executing unit may include: an interpreter that sequentially interprets the application program and creates an intermediate code for each second control cycle which is an integer multiple of the first control cycle; and an instruction value calculating unit that calculates the second instruction value for each first control cycle in accordance with the intermediate code created by the interpreter. A data synchronizing process may be performed between the first program executing unit, the second program executing unit, and the shared memory for each second control cycle in response to completion of processing by the interpreter.

According to this disclosure, it is possible to prevent a situation in which the shared variable value varies in the course of performing processes in the first program executing unit and the second program executing unit which perform a plurality of processes having different control cycles in parallel.

In this disclosure, the data synchronizing process may be performed in a next first control cycle after the processing completion of the interpreter.

According to this disclosure, when data synchronization is possible, it is possible to perform the data synchronizing process as early as possible and to more rapidly update the shared variable of the first program executing unit and the second program executing unit.

In this disclosure, the first program executing unit may execute the sequence program while referring to a value stored in the shared memory.

According to this disclosure, when the first program executing unit executes the sequence program, it is possible to provide processes with appropriate times and contents while referring to a processing state in the second program executing unit such as in the interpreter.

In this disclosure, the interpreter may write a second shared variable value which is referred to in the course of execution of a program to the shared memory in accordance with the codes described in the application program, and the codes described in the application program may include a special code for waiting for update of the second shared variable value by the first program executing unit after the second shared variable value has been updated.

According to this disclosure, by using the special code for an application program, it is not necessary to provide a command for synchronizing the processing times and it is possible to reduce the number of steps for developing a program.

In this disclosure, the special code may be defined in advance in a language form for describing the application program.

According to this disclosure, by employing a special code in a language form for describing the application program, a developer of the application program can use the special code without feeling unease.

In this disclosure, the interpreter may perform processing in a period in which none of the first program executing unit and the instruction value calculating unit performs processing.

According to this disclosure, even in a program execution environment in which operation resources are limited, it is possible to implement cooperative execution of a sequence program and an application program.

In this disclosure, the application program may be a numerical control program which is described in a predetermined language.

According to this disclosure, it is possible to implement control of a machine tool or the like which is controlled by numerical control with higher accuracy.

According to another embodiment of the disclosure, there is provided a control method of a control device. The control method includes: a step of executing a sequence program for each first control cycle and calculating a first instruction value; and a step of executing an application program which is described in codes which are sequentially interpreted and calculating a second instruction value for each first control cycle. The control device includes a shared memory configured to be accessible by both an execution entity of the sequence program and an execution entity of the application program. The step of calculating the first instruction value includes a step of writing a first shared variable value which is used in the course of execution of a program to the shared memory in accordance with a command included in the sequence program. The step of calculating the second instruction value includes a step of executing the application program while referring to the first shared variable value stored in the shared memory in accordance with the codes described in the application program.

According to this disclosure, it is possible to easily execute a sequence program and an application program in cooperation with each other by using writing and reference to a first shared variable value which is stored in the shared memory.

According to the embodiment of the disclosure, it is possible to provide an environment for easily executing a plurality of types of programs in cooperation with each other.

<A. Application Example>

First, an example of a scene to which one or more embodiments of the invention is applied will be described below with reference to FIG. 1. FIG. 1 is a diagram schematically illustrating an example of a scene in which a control device 100 according to an embodiment is applied. The control device 100 according to the embodiment controls an arbitrary control object (for example, manufacturing equipment or facilities).

As illustrated in FIG. 1, the control device 100 includes a first program executing unit 10 that executes a sequence program 30 for each first control cycle and calculates a first instruction value 14 and a second program executing unit 12 that executes an application program 32 described in codes which are sequentially interpreted and calculates a second instruction value 16 for each first control cycle.

The control device 100 includes a shared memory 20 configured to be accessible by both the first program executing unit 10 (that is, an execution entity of the sequence program 30) and the second program executing unit 12 (that is, an execution entity of the application program 32). The first program executing unit 10 writes a first shared variable value 18 which is used in the course of execution of the program to the shared memory 20 in accordance with a command included in the sequence program 30.

The first instruction value 14 and the second instruction value 16 are output to facilities or equipment as a control object by an input/output refreshing processing unit which is not illustrated. The first shared variable value 18 written in the shared memory 20 may be referred to by the second program executing unit 12. That is, the second program executing unit 12 may execute the application program 32 while referring to the first shared variable value 18 stored in the shared memory 20 in accordance with the codes described in the application program 32.

In this specification, the "sequence program" in the disclosure has a concept including a program which is entirely scanned every execution and for which one or more instruction values are calculated every execution. The "sequence program" includes a program including one or more commands which are described on the basis of the international standard IEC61131-3 which is defined by the International Electrotechnical Commission (IEC). The "sequence program" may include a sequence command and/or a motion command. The "sequence program" is not limited to commands which are described on the basis of the international standard IEC61131-3, and may include commands which are independently defined by a maker or a vendor of a programmable logic controller (PLC). In this way, the "sequence program" can be suitably used for control requiring immediacy and rapidity.

In this specification, a "sequence command" is a term basically including one or more commands which are described by one or more logical circuits that calculate an input value, an output value, an internal value, and the like. Basically, the "sequence command" in one control cycle is executed from the head to the tail, and the "sequence command" in a next control cycle is executed from the head to the tail again. In this specification, a "motion command" is a term including one or more commands for calculating numerical values of a position, a velocity, an acceleration, a jerk, an angle, an angular velocity, an angular acceleration, an angular jerk, and the like of actuators such as servo motors as instructions. In one control cycle, a "motion command" is executed from the head to the tail of a program of motion commands (a motion program) which is described by function blocks or numerical value calculating expressions. That is, the instruction values are calculated (updated) for each first control cycle.

The first instruction value 14 which is calculated by the first program executing unit 10 typically include ON/OFF of a digital output which is determined in accordance with a sequence command and an analog output which is calculated in accordance with a motion command.

In this specification, an "application program" includes an arbitrary program that is sequentially interpreted. That is, the "application program" includes a program which is described in an arbitrary language and which is executable in an interpreter manner in which the program is sequentially interpreted and executed row by row. In the following description, a program (hereinafter also referred to as an "NC program") that describing behavior of computer numerical control (CNC) is exemplified as the "application program." An NC program is described in a predetermined language.

The application program is not limited to such an NC program, and, for example, a program for controlling a robot can be applied thereas. For example, an NC program is often described in a "G language," and a program for controlling a robot is often described in a dedicated robot language.

As will be described later, an application program according to the embodiment is converted into an "intermediate code," and the second instruction value 16 is calculated for each first control cycle on the basis of the "intermediate code." In this specification, "intermediate code" is a concept including an arbitrary command for calculating an instruction value for each first control cycle in accordance with a sequentially interpreted program (originally, which is not suitable for a process in which an instruction value is updated in each predetermined cycle). That is, an intermediate code is not particularly limited as long as it can allow the second program executing unit 12 to calculate an instruction value for each first control cycle. Typically, an "intermediate code" includes one or more commands or one or more functions.

In the control device 100 according to the embodiment, a sequence program 30 which is entirely scanned for each first control cycle and an application program 32 which is sequentially interpreted are executed to calculate instruction values in accordance with the programs for each first control cycle. At this time, the first shared variable value 18 is calculated or updated in accordance with the sequence program 30. On the other hand, the second program executing unit 12 can control execution of an application program 32 with reference to the first shared variable value 18. For example, it is possible to implement a process of stopping interpretation of a next row until the first shared variable value 18 changes to a predetermined value.

In this way, in the embodiment, starting of execution, interrupting of execution, waiting for execution, ending of execution, and the like of the application program 32 can be indirectly controlled by appropriately updating the value of the first shared variable value 18 via the sequence program 30. Accordingly, in a system in which the sequence program 30 and the application program 32 are combined, a synchronization process based on the programs and the like can be easily implemented.

The shared variable value which is stored in the shared memory 20 by the application program 32 can be updated. In this case, the application program 32 can lead control for starting of execution, interrupting of execution, waiting for execution, ending of execution, and the like of the sequence program 30.

In the control device 100 according to the embodiment, when both the sequence program 30 and the application program 32 are executed, a shared variable value in the shared memory 20 can be accessed by the programs, and a system in which a plurality of types of program are combined can be implemented by appropriately using the shared variable value stored in the shared memory 20.

A more detailed configuration and process for the control device 100 according to the embodiment will be described below as a specific application example according to one or more embodiments of the invention.

<B. Example of Entire Configuration of Control System

Figure 2:
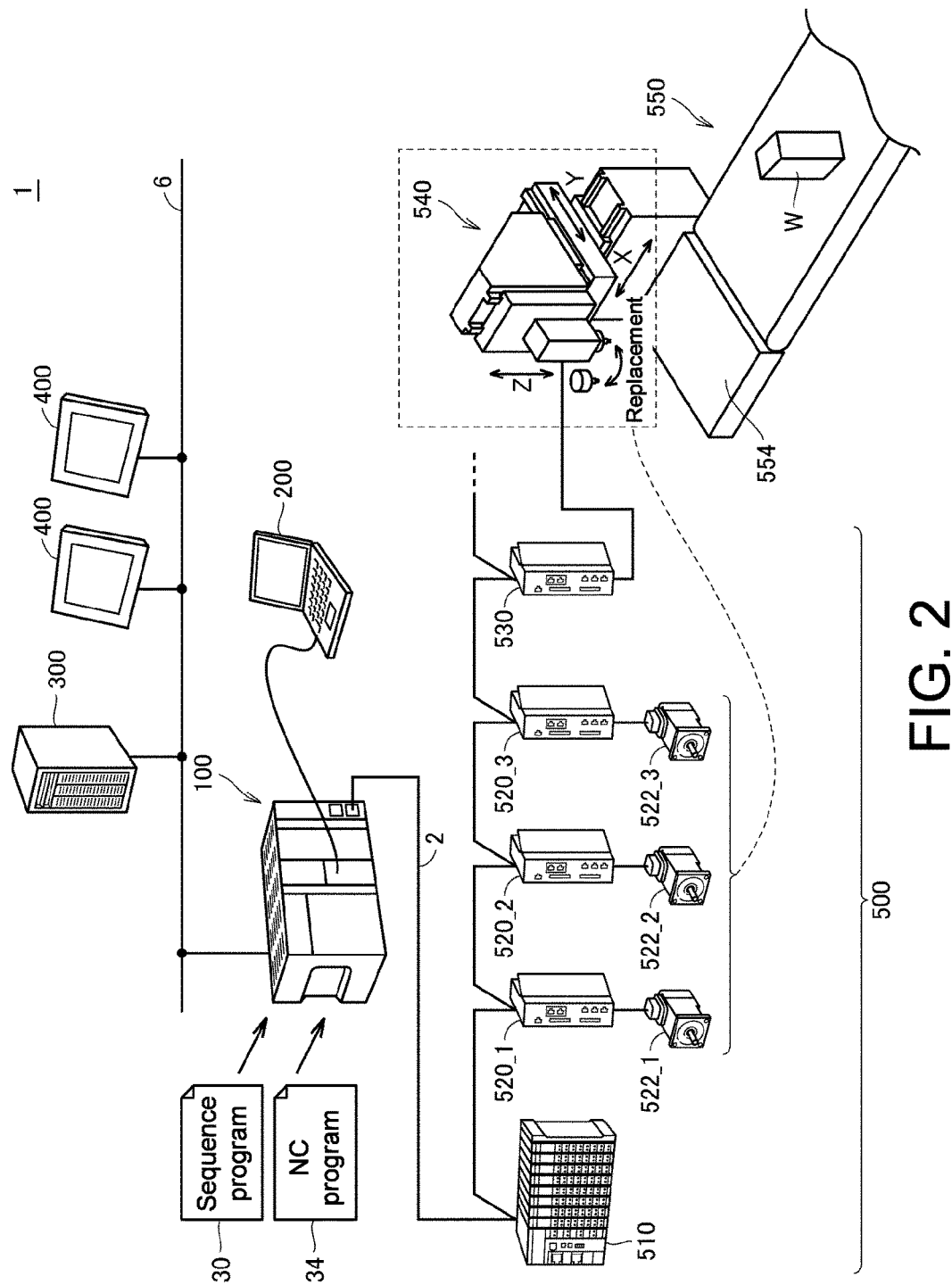
FIG. 2 is a diagram schematically illustrating an example of an entire configuration of a control system according to the embodiment.

An example of the entire configuration of a control system 1 including the control device according to the embodiment will be described below. FIG. 2 is a diagram schematically illustrating an example of the entire configuration of the control system 1 according to the embodiment. FIG. 2 illustrates the control system 1 with a focus on the control device 100 according to the embodiment.

The control device 100 corresponds to an industrial controller that controls a control object such as various facilities or equipment. The control device 100 is a kind of computer that executes a control operation as will be described later and may be typically embodied as a programmable logic controller (PLC).

In the configuration illustrated in FIG. 2, the control device 100 executes a sequence program 30 and an NC program 34 which is an example of an application program 32.

The control device 100 may be connected to various field devices 500 via the field network 2. The control device 100 transmits and receives data to and from one or more field devices 500 via the field network 2 or the like. In general, a "field network" is also referred to as a "field bus," but a field network and a field bus are generically referred to as a "field network" in the following description for the purpose of simplification of description. That is, a "field network" has a concept including a "field bus" in addition to a "field network" in the narrow sense.

A control operation which is performed in the control device 100 includes a process (an input process) of collecting data (input data) collected or generated in the field devices 500, a process (a calculation process) of generating data (output data) such as instruction values for the field devices 500, and a process (an output process) of transmitting the generated output data to target field devices 500.

It is preferable that the field network employ a bus or a network that enables fixed-cycle communication. As such a bus or network that enables fixed-cycle communication, EtherCAT (registered trademark), EtherNet/IP (registered trademark), DeviceNet (registered trademark), CompoNet (registered trademark), and the like are known. From the viewpoint that an arrival time of data is guaranteed, EtherCAT (registered trademark) can be preferably used.

An arbitrary field device 500 can be connected to the field network 2. The field device 500 includes an actuator that applies a certain physical action to production equipment, production lines, and the like on the field side and an input/output device that transmits and receives information to and from the field.

As described above, the control device 10 and the field device 500 transmit and receive data to and from each other via the field network 2, and the transmitted and received data is updated at a very short cycle of several hundreds of μsec to several tens of msec.

In the example of the configuration illustrated in FIG. 2, the control device 100 controls a CNC machine tool 540 and a conveyor device 550 that supplies a workpiece W to the CNC machine tool 540.

The CNC machine tool 540 machines an arbitrary object by controlling a machining center or the like in accordance with an NC program 34 that designates a position, a velocity, and the like. The CNC machine tool 540 is not limited to the illustrated one, and can be applied to an arbitrary machining device such as lathe machining, a milling machine, or electric discharge machining.

The CNC machine tool 540 and the conveyor device 550 are driven in accordance with instruction values from the control device 100. A workpiece W which is conveyed by the conveyor device 550 is disposed on the worktable 554 and is subjected to designated machining by the CNC machine tool 540.

In the example of the configuration illustrated in FIG. 2, the field device 500 includes a remote input/output (I/O) device 510, servo drivers 520_1, 520_2, and 520_3, servo motors 522_1, 522_2, and 522_3, and a servo driver 530.

The remote I/O device 510 typically includes a communication coupler that performs communication via the field network 2 and an input/output unit (hereinafter also referred to as an "I/O unit") that acquires input data and outputs output data. A device that collects input data such as an input relay or various sensors (such as an analog sensor, a temperature sensor, and a vibration sensor) and a device that applies a certain action to the field (such as an output relay, a contactor, a servo driver, and other actuators) are connected to the remote I/O device 510.

The field device 500 is not limited thereto and an arbitrary device (for example, a visual sensor) that collects input data, an arbitrary device (for example, an inverter device) that applies a certain action based on the output data, various robots, and the like can be employed.

The servo motors 522_1, 522_2, and 522_3 are assembled as a part of the CNC machine tool 540. The servo drivers 520_1, 520_2, and 520_3 drive corresponding servo motors in accordance with instruction values (for example, a position instruction value or a velocity instruction value) from the control device 100. In the example of the configuration illustrated in FIG. 2, the servo motors 522_1, 522_2, and 522_3 are drive sources of an X axis, a Y axis, and a Z axis of the CNC machine tool 540 and preferably controls the three axes together.

The servo driver 530 drives a servo motor (not illustrated) which is assembled into a mechanism for replacing a tip tool of the CNC machine tool 540. Replacement of a tip tool needs to be performed in synchronization with control of the X-axis, the Y axis, and the Z axis of the CNC machine tool 540.

The control device 100 according to the embodiment can creates an instruction value for controlling behavior of the CNC machine tool 540 by executing the NC program 34 as well as an instruction value determined in accordance with a sequence command and a motion command by executing the sequence program 30. Here, execution start and execution end of the NC program 34 and the like are controlled by a control command included in the sequence program 30.

In the following description, it is assumed that the X axis, the Y axis, and the Z axis of the CNC machine tool 540 are mainly controlled by the NC program 34 and an operation of replacing a tip tool of the CNC machine tool 540 is mainly controlled by the sequence program 30.

The control device 100 is also connected to another device via a host network 6. Ethernet (registered trademark) or EtherNet/IP (registered trademark) which is a general network protocol may be employed as the host network 6. More specifically, one or more servers 300 and one or more display devices 400 may be connected to the host network 6.

A database system, a manufacturing execution system (MES), or the like is assumed as the server 300. The manufacturing execution system serves to acquire information from manufacturing equipment or facility as a control object and to monitor and manage the whole production, and may handle order information, quality information, shipment information, and the like. Not limited thereto, a device that provides an information system service may be connected to the host network 6. A process of acquiring information from manufacturing equipment or facility as a control object and performing macro or micro interpretation is assumed as the information system service. For example, data mining of extracting a certain feature tendency included in information from manufacturing equipment or facility as a control object, a machine learning tool that performs machine learning based on information from manufacturing equipment or facility as a control object, and the like are assumed.

The display device 400 receives an operation from a user, outputs a command based on a user operation or the like to the control device 100, and graphically displays operation results and the like in the control device 100.

A support device 200 can be connected to the control device 100. The support device 200 is a device that supports necessary preparation for causing the control device 100 to control a control object. Specifically, the support device 200 provides a development environment of a program (a program preparing and editing tool, a parser, a compiler, and the like) which is executed in the control device 100, a setting environment for setting configuration information (arrangement) of the control device 100 and various devices connected to the control device 100, a function of outputting a created user program to the control device 100, a function of correcting and changing a user program and the like which is executed in the control device 100 and the like on line.

<C. Example of Hardware Configuration of Control Device>

An example of a hardware configuration of the control device 100 according to the embodiment will be described below.

Figure 3:
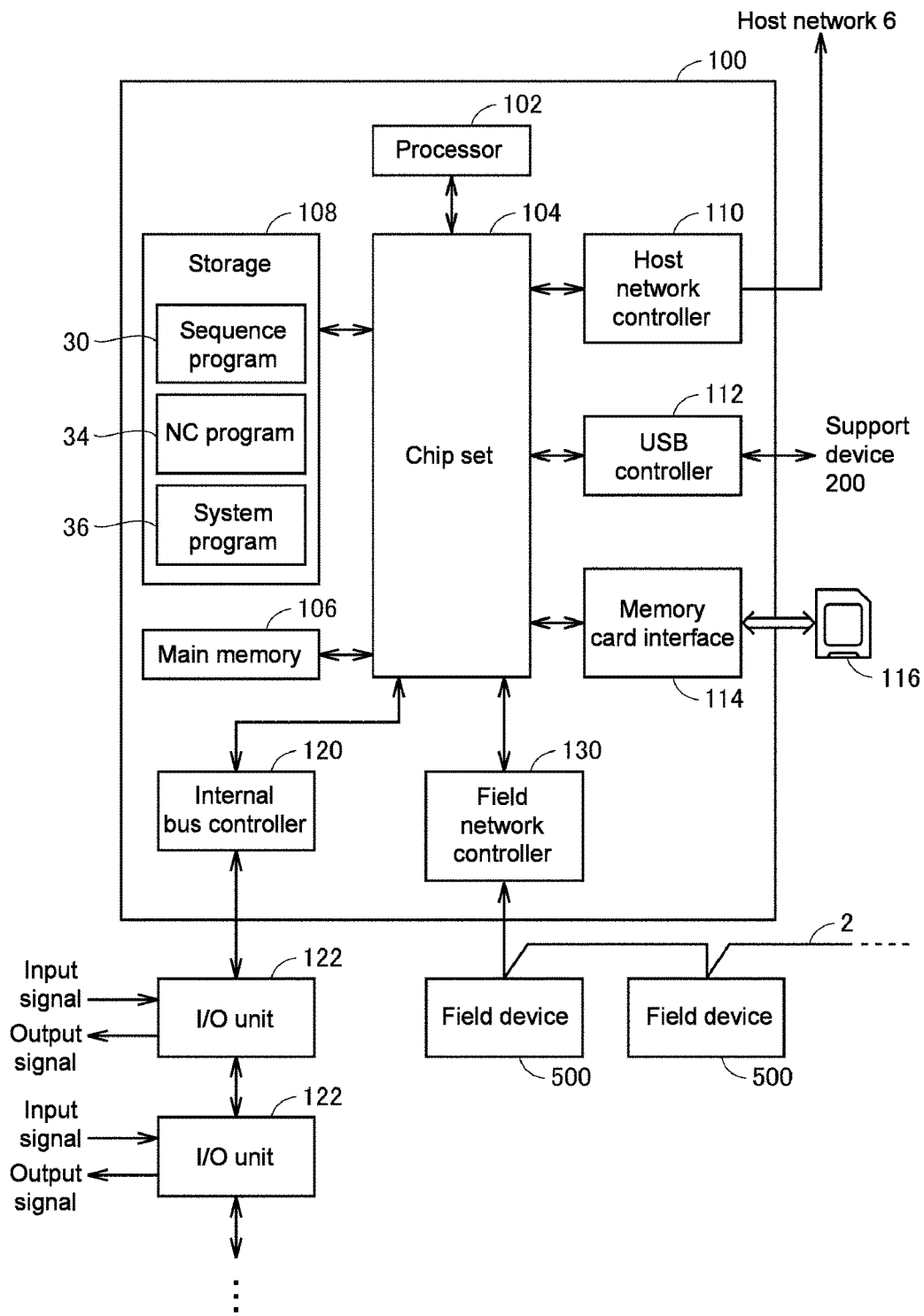
FIG. 3 is a block diagram illustrating an example of a hardware configuration of the control device according to the embodiment.

FIG. 3 is a block diagram illustrating an example of a hardware configuration of the control device 100 according to the embodiment. Referring to FIG. 3, the control device 100 is an operation processing unit which is called a CPU unit and includes a processor 102, a chip set 104, a main memory 106, a storage 108, a host network controller 110, a universal serial bus (USB) controller 112, a memory card interface 114, an internal bus controller 120, and a field network controller 130.

The processor 102 includes a central processing unit (CPU), a micro processing unit (MPU), a graphics processing unit (GPU). A configuration including a plurality of cores may be employed as the processor 102, or a plurality of processors 102 may be arranged. The chip set 104 implements the entire processes of the control device 100 by controlling the processor 102 and peripheral elements thereof. The main memory 106 is constituted by a volatile storage device such as a dynamic random access memory (DRAM) or a static random access memory (SRAM). The storage 108 is constituted by a nonvolatile storage device such as a hard disk drive (HDD) or a solid-state drive (SSD).

The processor 102 implements control depending on a control object and various processes which will be described later by reading various programs stored in the storage 108 and loading and executing the programs in the main memory 106. A system program 36 that implements basic functions and user programs (the sequence program 30 and the NC program 34) which are prepared depending on manufacturing equipment or facilities as a control object are stored in the storage 108.

The host network controller 110 controls transmission and reception of data to and from the server 300 or the display device 400 (see FIG. 3) via the host network 6. The USB controller 112 controls transmission and reception of data to and from the support device 200 via a USB connector.

The memory card interface 114 has a configuration in which a memory card 116 is attachable and detachable thereto and therefrom, and is configured to write data to the memory card 116 or to read a variety of data (such as a user program or trace data) from the memory card 116.

The internal bus controller 120 controls transmission and reception of data to and from an I/O unit 122 mounted on the control device 100. The field network controller 130 controls transmission and reception of data to and from a field device via the field network 2.

FIG. 3 illustrates an example of a configuration in which necessary functions are provided by causing the processor 102 to execute a program, but some or all of the functions to be provided may be mounted using a dedicated hardware circuit (for example, an application specification integrated circuit (ASIC) or a field-programmable gate array (FPGA)). Alternatively, principal parts of the control device 100 may be implemented using hardware based on a general-purpose architecture (for example, an industrial PC based on a general-purpose PC). In this case, using virtualization technology, a plurality of operating systems (OSs) having different purposes may be executed in parallel and necessary applications may be executed on the OSs.

In the control system 1 illustrated in FIG. 2, the control device 100, the support device 200, and the display device 400 are provided as individual structures, but a configuration in which all or some of the functions are integrated on a single device may be employed.

<D. Program Executing Mechanism>

An example of a program executing mechanism of the control device 100 according to the embodiment will be described below.

Figure 4:
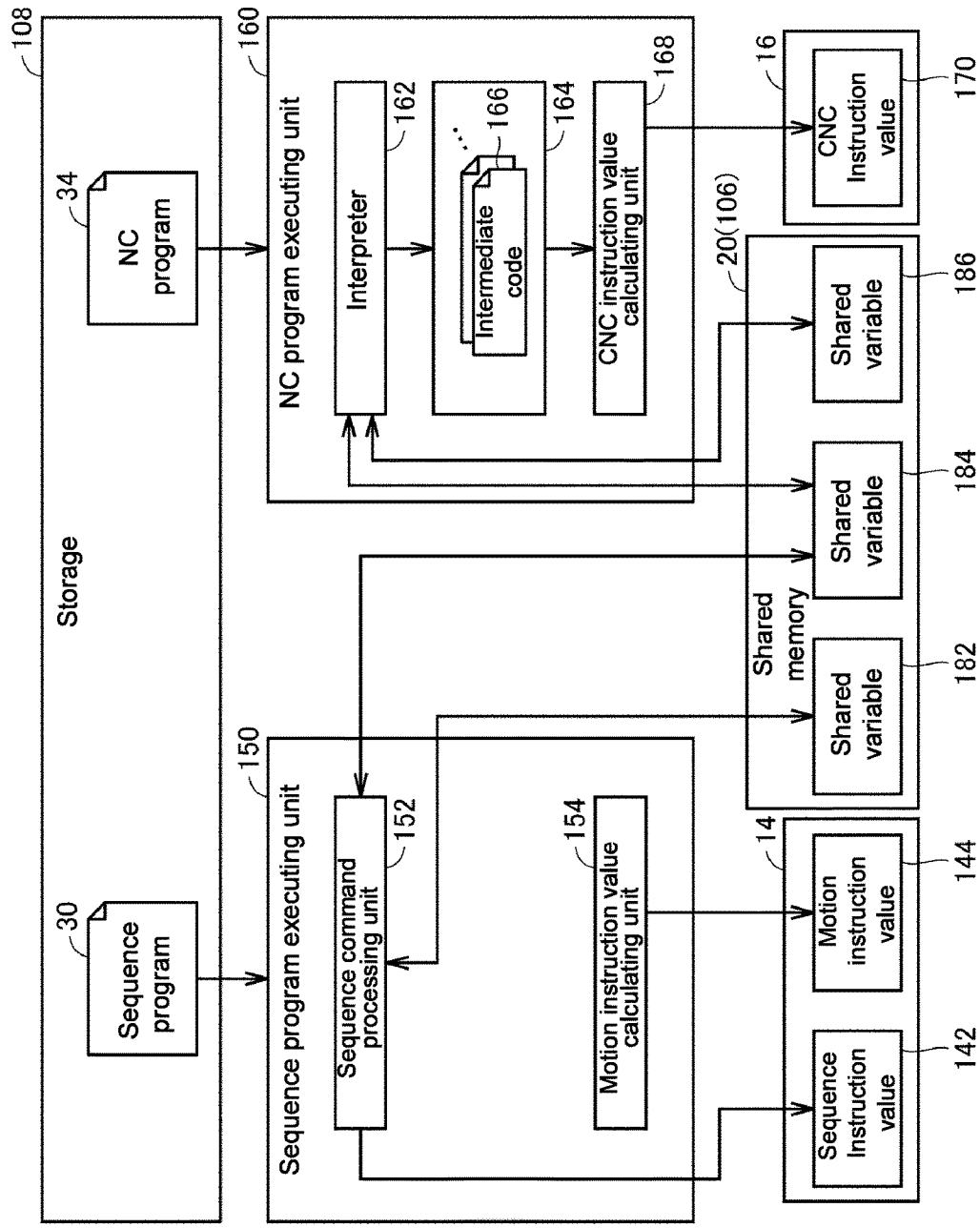
FIG. 4 is a diagram schematically illustrating an example of a configuration of a program executing mechanism in the control device according to the embodiment.

FIG. 4 is a diagram schematically illustrating an example of a configuration of a program execution mechanism in the control device 100 according to the embodiment. Referring to FIG. 4, the control device 100 includes a sequence program executing unit 150 which is a specific example of the first program executing unit 10 and a numerical control program executing unit 160 (hereinafter also referred to as an "NC program executing unit") which is a specific example of the second program executing unit 12.

The sequence program executing unit 150 executes a sequence program 30 for each first control cycle and calculates a first instruction value 14. Specifically, the sequence program executing unit 150 includes a sequence command processing unit 152 and a motion instruction value calculating unit 154 and executes the sequence program 30.

The sequence command processing unit 152 interprets a sequence command included in the sequence program 30, executes a designated sequence operation (a logical operation), and calculates or updates a sequence instruction value 142 for very first control cycle. The sequence program executing unit 150 writes a first shared variable value (for example, a shared variable 184) which is used in the course of execution of a program to the shared memory 20.

In the following description, for the purpose of convenience of description, a cycle corresponding to the first control cycle is simply referred to as a "control cycle" and a cycle (typically an integer multiple of the first control cycle) corresponding to a second control cycle is also referred to as an "application cycle."

The motion instruction value calculating unit 154 calculates a motion instruction value 144 in accordance with a motion command included in the sequence program 30. A motion command defines calculation of the motion instruction value 144 over a plurality of control cycles by one command, and the motion instruction value calculating unit 154 interprets the motion command and calculates the motion instruction value 144 for each control cycle.

The sequence instruction value 142 calculated by the sequence command processing unit 152 and the motion instruction value 144 calculated by the motion instruction value calculating unit 154 are an example of the first instruction value 14.

The NC program executing unit 160 executes an application program 32 (an NC program 34 in the example illustrated in FIG. 4) described by a code which is sequentially interpreted and calculates a second instruction value 16 for each first control cycle. That is, the NC program executing unit 160 executes the NC program 34 in an interpreter manner and calculates an instruction value for each motor (hereinafter also referred to as a "CNC instruction value 170") for each control cycle.

Calculation or update of the CNC instruction value 170 by the NC program executing unit 160 is repeatedly performed for each control cycle. In this way, the NC program executing unit 160 calculates the CNC instruction value 170 based on the NC program 34 in synchronization with calculation of an instruction value by the sequence program executing unit 150. In order to implement calculation of an instruction value for each control cycle, an intermediate code for calculating an instruction value is used in the NC program executing unit 160.

The NC program executing unit 160 executes an application program 32 with reference to the first shared variable value (for example, a shared variable 184) stored in the shared memory 20 in accordance with the code described in the application program 32 (the NC program 34 in the example illustrated in FIG. 4).

More specifically, the NC program executing unit 160 includes an interpreter 162, an intermediate code buffer 164, and a CNC instruction value calculating unit 168.

The interpreter 162 sequentially interprets the application program 32 (the NC program 34 in the example illustrated in FIG. 4) for each application cycle (second control cycle) which is an integer multiple of the control cycle (the first control cycle) and creates an intermediate code 166. The interpreter 162 sequentially stores the created intermediate code 166 in the intermediate code buffer 164. The interpreter 162 creates the intermediate code 166 from the NC program 34 previously by a certain degree. Accordingly, a plurality of intermediate codes 166 may be stored in the intermediate code buffer 164. In this embodiment, the interpreter 162 creates a trace for calculating the CNC instruction value 170 and thus may be referred to as a "planner."

Interpretation of the NC program 34 by the interpreter 162 is repeatedly performed by every application cycle (second control cycle). When resources of the processor 102 of the control device 100 are limited, processing of the interpreter 162 is interrupted while processing for each control cycle by the sequence program executing unit 150 and/or the CNC instruction value calculating unit 168 is being performed. Accordingly, the interpreter 162 can read a part of the NC program 34 and perform processing such as creation of an intermediate code within a range in which processing can be completed in each application cycle.

The CNC instruction value calculating unit 168 calculates the CNC instruction value 170 (the second instruction value) for each control cycle (first control cycle) in accordance with the intermediate code 166 created by the interpreter 162. In general, since commands (codes) described in an NC program are sequentially interpreted, there is no guarantee that the CNC instruction value 170 can be calculated for each operation cycle, but calculation of the CNC instruction value 170 for each control cycle can be implemented using the intermediate code 166.

The interpreter 162 sequentially queues the created intermediate code 166 in the intermediate code buffer 164, and the CNC instruction value calculating unit 168 reads the intermediate codes 166 which are sequentially queued in the intermediate code buffer 164.

The shared memory 20 is configured to be accessible by both the sequence program executing unit 150 and the numerical control program executing unit 160. Typically, the shared memory 20 is embodied by an area which is provided by the main memory 106 (see FIG. 3) of the control device 100. One or more shared variable values may be stored in the shared memory 20. The shared variable values can be accessible by the sequence program executing unit 150 and/or the numerical control program executing unit 160.

In the example illustrated in FIG. 4, for example, a shared variable 182 that is written from the sequence command processing unit 152, a shared variable 184 that is written from both the sequence command processing unit 152 and the interpreter 162, and a shared variable 186 that is written from the interpreter 162. Without being limited to the example illustrated in FIG. 4, arbitrary shared variables which can be written/read by some elements of the sequence program executing unit 150 and/or the numerical control program executing unit 160 may be defined.

An exclusive operation for preventing a plurality of elements from simultaneously writing values or the like may be mounted for some shared variables.

<E. Intel Mediate Code>

An example of an intermediate code which is created by causing the interpreter 162 of the NC program executing unit 160 to interpret an NC program 34 will be described below.

Figure 5:
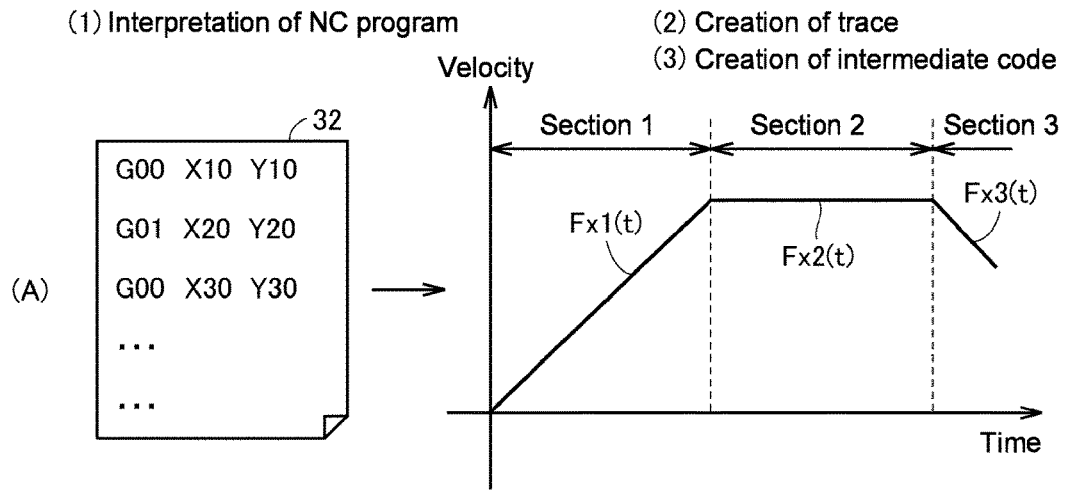
FIG. 5 is a diagram schematically illustrating an example in which an intermediate code is created in the control device according to the embodiment.
Figure 5:
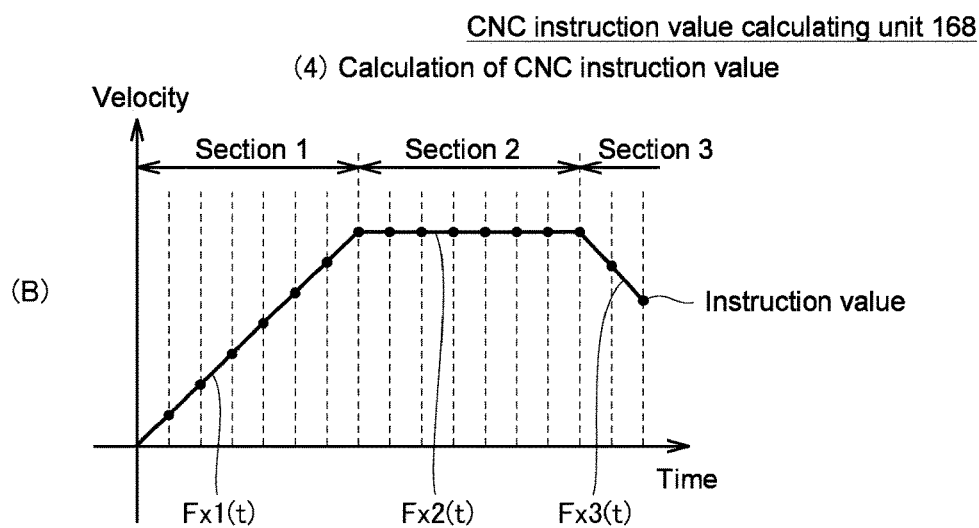

FIG. 5 is a diagram schematically illustrating an example in which an intermediate code is created in the control device 100 according to the embodiment. Referring to the part A of FIG. 5, when the interpreter 162 of the NC program executing unit 160 sequentially performs an NC program 34, commands included in the NC Program 34 are interpreted ((1) interpretation of NC Program). By this interpretation of commands, a prescribed trace is internally created ((2) creation of trace). When a group including a plurality of axes is defined, a trace may be created for each axis or a trace for defining behavior of all the axes included in the group may be created.

Finally, the interpreter 162 divides the created trace into predetermined sections and creates one or more functions (intermediate codes) of defining the trace of each section ((3) creation of intermediate code).

A plurality of sections may be defined by a common intermediate codes, or one section may be further divided to create respective common codes thereof. That is, commands in an NC program 34 or sections of a trace defined by the commands do not need to match the number of created intermediate codes, and the intermediate codes may be arbitrarily created. An output form of the intermediate codes 166 may be appropriately designed in consideration of a required time width of a control cycle.

As illustrated in the part A of FIG. 5, for example, the intermediate code 166 may be a function of defining a relationship between the time and the instruction value. In the example illustrated in the part A of FIG. 5, a trace which has been internally created can be defined by a combination of straight lines. For example, with respect to the X axis, traces of straight sections (sections 1 to 3) can be output as functions Fx1(5), Fx2(t), and Fx3(5) indicating a relationship between the time and the velocity. With respect to other axes (for example, the Y axis and the Z axis) included in the same group, functions may be output similarly.

As illustrated in the part B of FIG. 5, when the CNC instruction value calculating unit 168 of the NC program executing unit 160 calculates an instruction value for each control cycle in accordance with the created intermediate codes 166, an instruction value for each control cycle is calculated ((4) calculation of instruction value (corresponding to the number of axes)). That is, by inputting the times of the control cycles to the functions corresponding to the sections, the instruction value at the time can be uniquely determined. When a certain group is set, it is preferable that instruction values be synchronously output with respect to the axes included in the group.

FIG. 5 illustrates an example in which the intermediate codes are described using the G language which are used for CNC, but the disclosure is not limited thereto and any program language can be used as long as a program can be executed in an interpreter manner. The format of the intermediate codes to be created may be set to vary depending on a language to be processed.

<F. Execution of Program and Synchronization Cycle of Data>

Execution of program and synchronization cycle of data in the control device 100 according to the embodiment will be described below.

Figure 6:
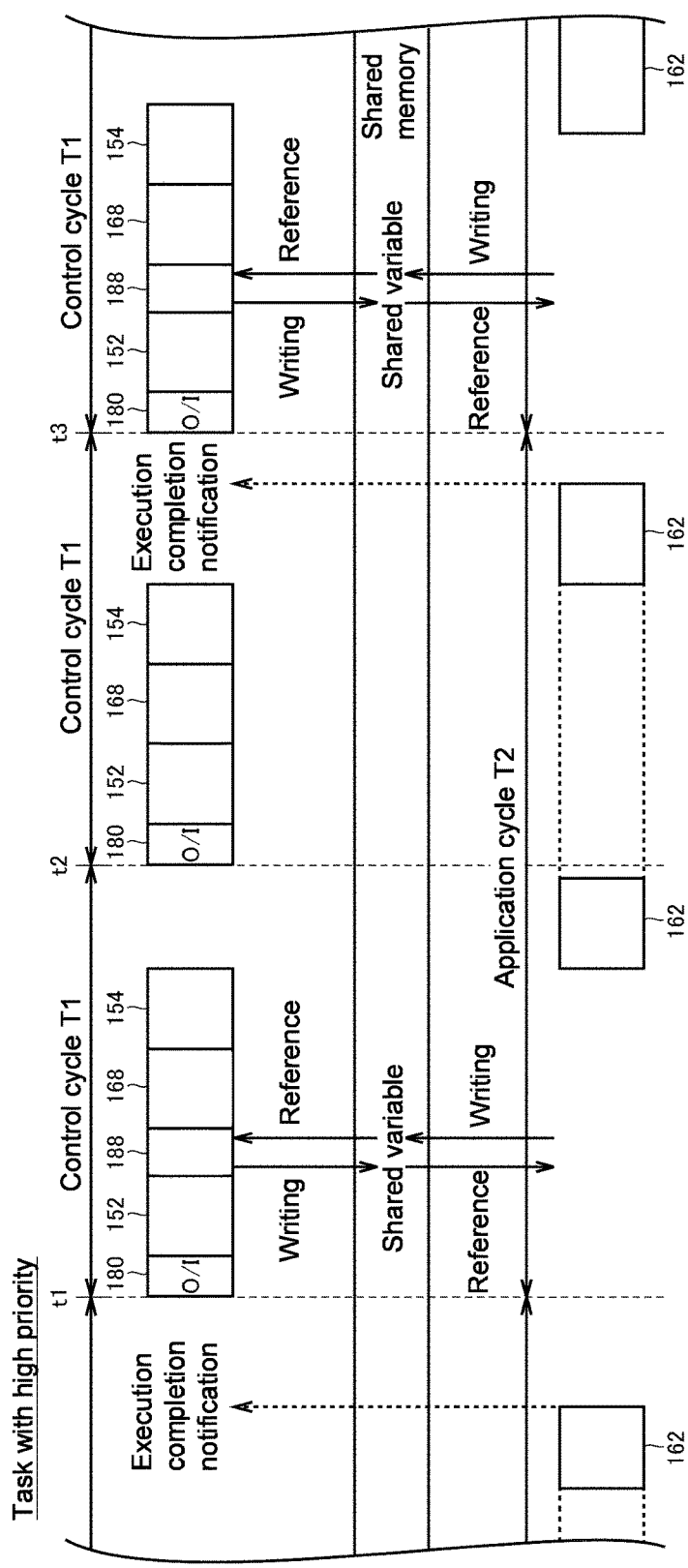
FIG. 6 is a timing chart illustrating cycles of program execution and data synchronization in the control device according to the embodiment.

FIG. 6 is a timing chart illustrating execution of a program and synchronization cycle of data in the control device 100 according to the embodiment. FIG. 6 illustrates an example in which a plurality of tasks are set by priorities and the tasks share resources of the processor 102 depending on the priorities.

In the example illustrated in FIG. 6, it is assumed that four processes such as (1) an input/output refreshing process 180 including a process of acquiring input data on a field side and a process of outputting a calculated instruction value to the field side, (2) a process of calculating a sequence instruction value 142 by causing the sequence command processing unit 152 to execute the sequence program 30, (3) a process of calculating a CNC instruction value 170 by causing the CNC instruction value calculating unit 168 to execute the NC program 34, and (4) a process of calculating a motion instruction value 144 by causing the motion instruction value calculating unit 154 to execute the sequence program 30 are set as tasks with high priorities.

It is also assumed that sequentially interpretation of an NC Program 34 by the interpreter 162 of the NC program executing unit 160 is set as a task with a low priority.

The tasks with high priorities are repeatedly performed for each predetermined control cycle T1. In the processing example illustrated in FIG. 6, the task with a low priority is appropriately performed in a period in which the tasks with high priorities are not performed. That is, for each control cycle, an execution time of the tasks with high priorities is assigned and the task with a low priority is executed in a time other than the execution time of the tasks with high priorities. More specifically, the interpreter 162 of the NC program executing unit 160 may perform a process in a period in which none of the sequence program executing unit 150 and the CNC instruction value calculating unit 168 performs processing.

When a multi-core processor is employed as the processor 102 or a plurality of processors 102 are arranged, the task with a high priority and the task with a low priority may be executed in parallel.

First, the task with a high priority will be described below. When a start time of each control cycle arrives, the input/output refreshing process 180 is first performed, and then the sequence command processing unit 152 calculates the sequence instruction value 142 by executing the sequence program 30. The CNC instruction value calculating unit 168 calculates the CNC instruction value 170 on the basis of the intermediate code 166 which is created by interpreting the NC Program 34. The motion instruction value calculating unit 154 calculates the motion instruction value 144 in accordance with a motion command included in the sequence program 30. Thereafter, the same process is repeated for each control cycle T1.

As a task with a high priority, a data synchronizing process 188 of synchronizing shared variables between the sequence program executing unit 150, the NC program executing unit 160, and the shared memory 20 is performed (basically) for each application cycle T2.

Through the data synchronizing process 188, the sequence command processing unit 152 can refer to the shared variables stored in the shared memory 20 in the course of calculating the sequence command value 142 or the like. The CNC instruction value calculating unit 168 and/or the motion instruction value calculating unit 154 can refer to the shared variables stored in the shared memory 20 in the course of execution of a program or the like.

When performing of the task with a high priority for each control cycle is completed, a set of a sequence instruction value 142, a CNC instruction value 170, and a motion instruction value 144 is calculated. Such instruction values are reflected on the field side by the input/output refreshing process 180 when a start time of a next control cycle arrives. Values of the shared variables which have to be reflected in the shared memory 20 are reflected in the shared memory 20 by the data synchronizing process 188.

FIG. 6 illustrates an example in which the process routine progresses in the order of calculation of the sequence instruction value 142, calculation of the CNC instruction value 170, and calculation of the motion instruction value 144 for the purpose of convenience of description, but the order of the process routine may be appropriately changed or each process may be further segmented and alternately performed. That is, data which is to be output as external data including instruction values has only to be calculated after performing of the previous input/output refreshing process 180 has been completed and before performing of the next input/output refreshing process 180 has started.

Now, a task with a low priority will be described below. A process by the interpreter 162 of the NC program executing unit 160 is triggered for each predetermined application cycle T2 (basically an integer multiple of the control cycle T1). The interpreter 162 of the NC program executing unit 160 sequentially interprets the NC program 34. The intermediate code 166 which is created by causing the interpreter 162 to interpret the NC program 34 is sequentially queued (enqueued) in the intermediate code buffer 164 (see FIG. 4). The intermediate code 166 queued in the intermediate code buffer 164 is dequeued by the CNC instruction value calculating unit 168 and is used to calculate the CNC instruction value 170.

The interpreter 162 can create an intermediate code which is required for the CNC instruction value calculating unit 168 to calculate the CNC instruction value 170 with a margin in advance by interpreting the NC program 34 in advance.

As illustrated in FIG. 6, the interpreter 162 may fragmentally perform sequential interpretation of the NC program 34 with an interruption inserted into the middle. Since this execution form is employed, there is a likelihood that a value of a shared variable of a reference destination will be vary during the processing when the data synchronizing process 188 for the shared memory 20 is performed for each control cycle T1.

Therefore, in the embodiment, the data synchronizing process 188 between the sequence program executing unit 150, the NC program executing unit 160, and the shared memory 20 is performed for each application cycle T2 in response to completion of the process by the interpreter 162. By performing such an exclusive operation on the shared memory 20, a situation in which a shared variable of a reference destination varies during the processing can be avoided.

More specifically, the interpreter 162 sequentially performs a process of interpreting at least a part of the NC program 34 for each application cycle T2. A code quantity of the NC program 34 which is interpreted in one application cycle T2 by the interpreter 162 varies. Accordingly, when processing of a target code is completed for each application cycle T2, the interpreter 162 issues an execution completion notification. The data synchronizing process 188 is performed in response to the execution completion notification.

The data synchronizing process 188 can be performed at any time in a target control cycle T1, but is performed after the processing of the sequence command processing unit 152 is completed and before the processing of the CNC instruction value calculating unit 168 is performed in this embodiment. This is for immediately reflecting a value, which is output as a shared variable among the instruction values created by the sequence command processing unit 152, in the shared memory 20.

In order to minimize a time delay of reflection of the shared variable value in the shared memory 20, the data synchronizing process 188 may be performed in a next control cycle T1 after the processing of the interpreter 162 has been completed.

By performing recording of and referring to the shared variable in the shared memory 20 illustrated in FIG. 6 for each application cycle T2 in response to completion of the processing of the interpreter 162, sharing or exchange of a necessary shared variable can be implemented without causing a mismatch of the shared variable between the process of executing the sequence program 30 and the process of executing the NC program 34.

When it is not necessary to control strict synchronization of processes between the sequence program 30 and the NC program 34, recording of and referring to the shared variable in the shared memory 20 may be performed in the control cycle of each of a task with a high priority and a task with a low priority. By making an exclusive operation for the shared memory 20 unnecessary between the sequence program executing unit 150 and the numerical control program executing unit 160, it is possible to simplify system processing in the control device 100.

<G. Example of Program>

An example of a program of performing control using a shared variable between the sequence program 30 and the NC program 34 will be described below.

Figure 7:
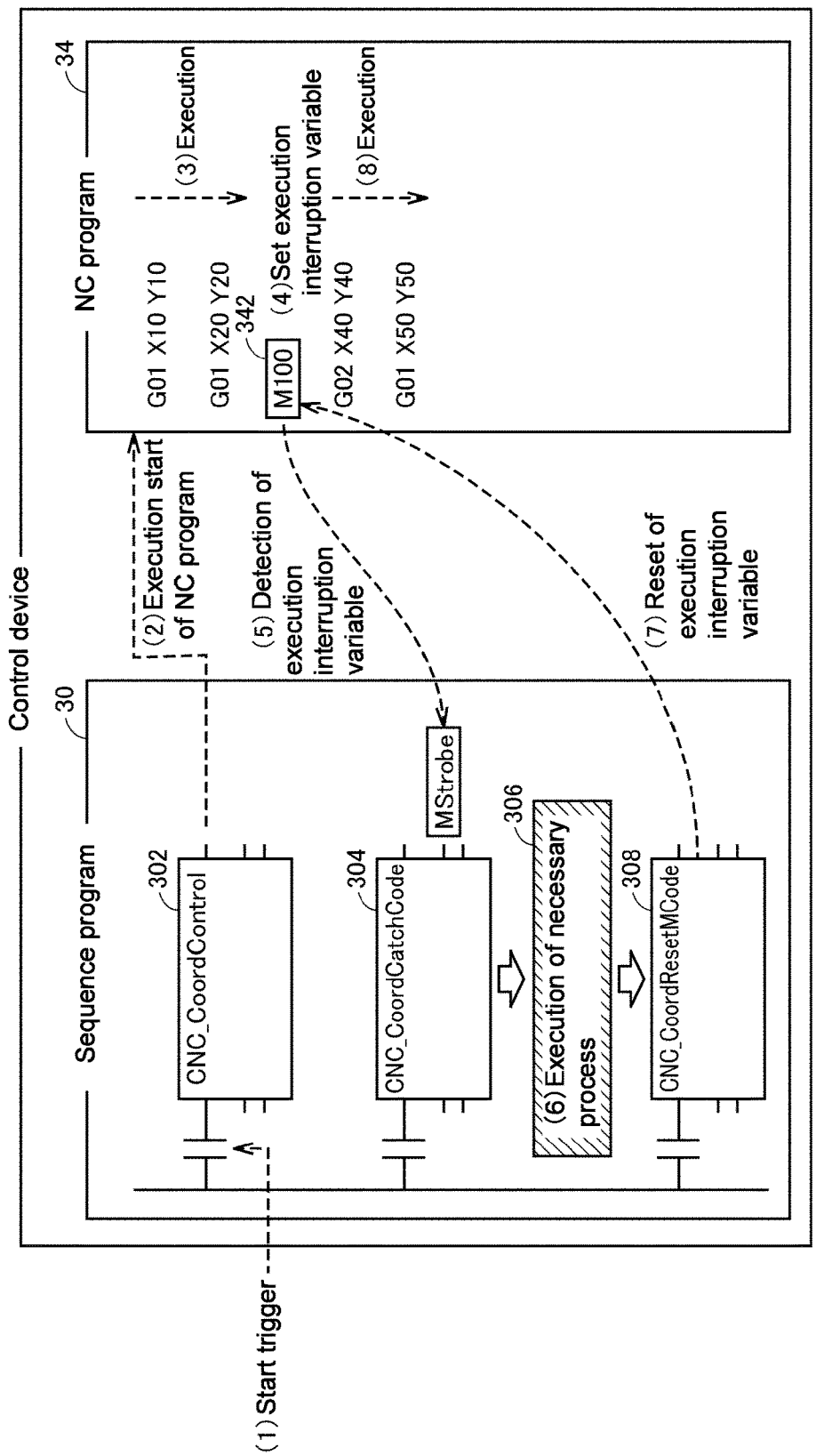
FIG. 7 is a diagram schematically illustrating an example of programs when a sequence program and an NC program are executed in cooperation in the control device according to the embodiment.

FIG. 7 is a diagram schematically illustrating an example of a program when the sequence program 30 and the NC program 34 are executed in cooperation in the control device 100 according to the embodiment. Referring to FIG. 7, it is assumed that the sequence program 30 and the NC program 34 are executed in parallel in the control device 100.

Two programs illustrated in FIG. 7 can be applied to, for example, an application of performing a first machining process on a workpiece W in accordance with the NC program 34, then replacing a tip tool of the CNC machine tool 540, and then performing a second machining process on the workpiece W in accordance with the NC program 34 in the CNC machine tool 540 illustrated in FIG. 2. In this case, for example, a first half of the NC program 34 illustrated in FIG. 7 corresponds to a code for describing the first machining process and a second half thereof corresponds to a code for describing the second machining process. The sequence program 30 may include a command for replacing the tip tool of the CNC machine tool 540.

The sequence program 30 which is executed by the sequence program executing unit 150 includes a CNC_CoordControl (CNC coordinate control) command 302. The CNC_CoordControl command 302 is a command for starting execution of the NC program 34 in the numerical control program executing unit 160. When it is instructed to execute the CNC_CoordControl command 302 ((1) starting trigger), an internal execution instruction is given to the numerical control program executing unit 160 ((2) execution start of NC program), and execution of the NC program 34 by the numerical control program executing unit 160 is started ((3) execution). At this time, the code included in the NC Program 34 is sequentially interpreted.

The NC program 34 includes a special code 342 for controlling execution of the NC program 34. The special code 342 described in the NC program 34 instructs to wait for update of an execution interruption variable by the sequence program executing unit 150 after updating the value of the execution interruption variable (the second shared variable value). When the special code 342 is interpreted, a value of a corresponding shared variable stored in the shared memory 20 is updated. In the example illustrated in FIG. 7, a code "M100" is described as the special code 342 in a form similar to description using the G language. In this way, the special code 342 may be defined in advance in a language form for describing the NC program 34 (or the application program 32).

The data format of the shared variable is not particularly limited, and it is assumed in the embodiment that the data format is a Boolean value which is set (set to TRUE) or reset (set to FALSE). For the purpose of convenience of description, such as shared variable is also referred to as an "execution interruption variable." That is, when the special code 342 of the NC program 34 is interpreted by the numerical control program executing unit 160, the execution interruption variable stored in the shared memory 20 is set ((4) setting of execution interruption variable) and execution of the NC program 34 is stopped. That is, the special code 34s included in the NC program 34 does not return a response of execution completion until the execution interruption variable is reset, and execution of the NC program 34 is substantially interrupted at the position of the special code 342.

On the other hand, the sequence program 30 which is executed by the sequence program executing unit 150 includes CNC_CoordCatchMCode (CNC coordinate M code detection) command 304. The CNC_CoordCatchMCode command 304 monitors the value of the execution interruption variable stored in the shared memory 20 during execution (a validated period). Then, when the execution interruption variable is set (set to TRUE), the CNC_CoordCatchMCode command 304 outputs TRUE as a detection result ((5) detection of execution interruption variable).

A process 306 which is prescribed in the sequence program 30 is performed in response to the output of TRUE from the CNC_CoordCatchMCode command 304 ((6) execution of necessary process).

When execution of the prescribed process 306 is completed, a CNC_CoordResetMCode (CNC coordinate M code reset) command 308 which is included in the sequence program 30 is performed. The CNC_CoordResetMCode command 308 resets the value of the execution interruption variable stored in the shared memory 20 ((7) resetting of execution interruption variable). That is, the value of the execution interruption variable stored in the shared memory 20 is changed to FALSE by executing the CNC_CoordResetMCode command 308.

When the value of the execution interruption variable is changed to FALSE, a response of execution completion of the special code 342 included in the NC program 34 is returned and interpretation of subsequent codes is restarted. That is, codes subsequent to the special code 342 included in the NC program 34 are sequentially executed ((8) execution).

As described above, by causing the NC program 34 side to record and refer to the value of the shared variable (the execution interruption variable in the above-mentioned example) stored in the shared memory 20 and causing the sequence program 30 side to record and refer to the value of the shared variable, the execution times of the sequence program 30 and the NC program 34 can be easily and accurately controlled.

Figure 8:
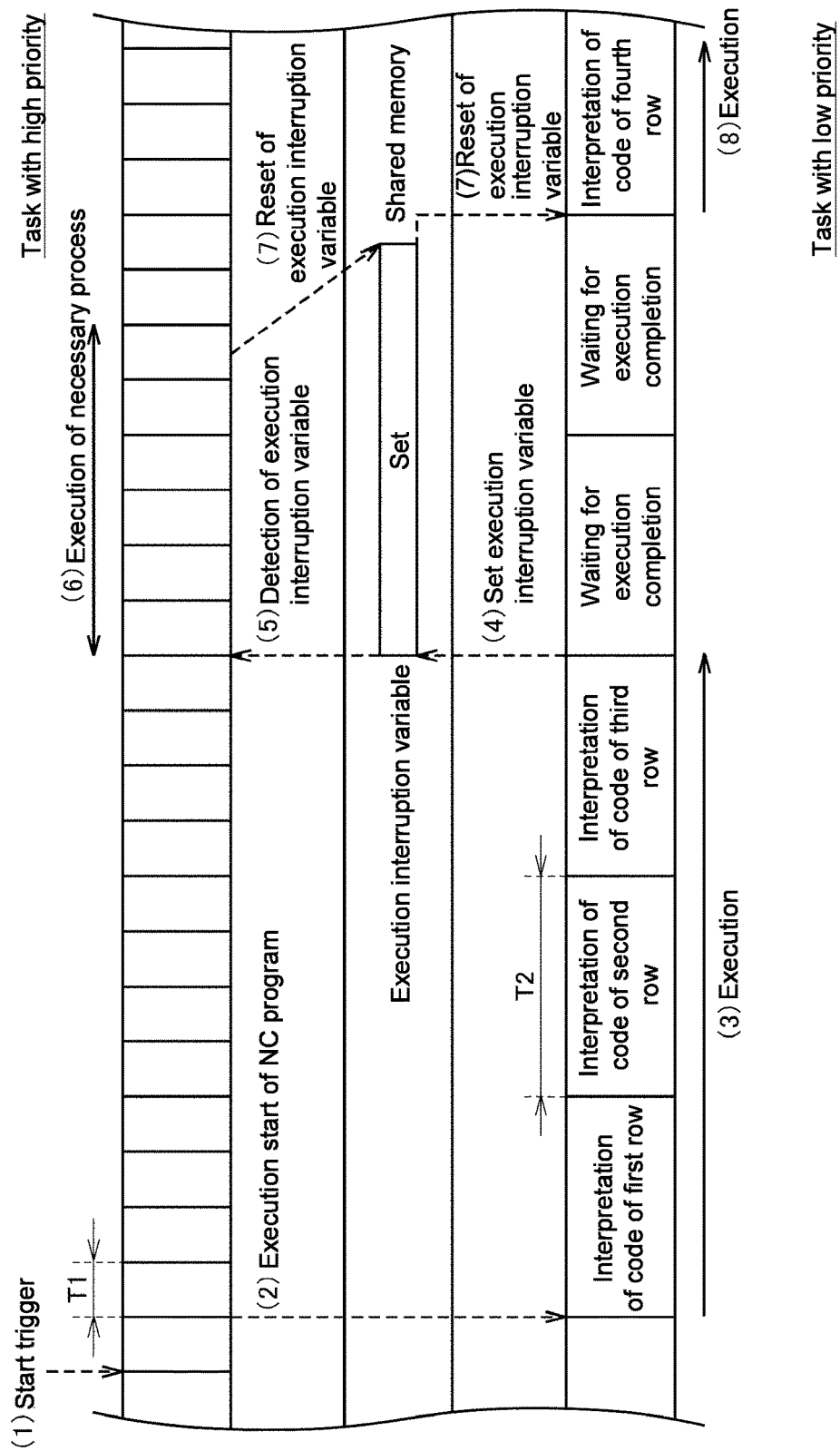
FIG. 8 is a timing chart illustrating processes when a sequence program and an NC program illustrated in FIG. 7 are executed in cooperation.

FIG. 8 is a timing chart illustrating processes when the sequence program 30 and the NC Program 34 which are illustrated in FIG. 7 are executed in cooperation with each other. FIG. 8 illustrates changes of processes over time of a task with a high priority and a task with a low priority to correspond to the timing chart illustrated in FIG. 6.

Basically, the sequence program 30 is a task with a high priority and is repeatedly executed for each control cycle T1. Sequential interpretation of the NC program 34 is a task with a low priority and is sequentially executed for each application cycle T2.

First, when a start trigger is given at a time in a control cycle T1 ((1) start trigger), it is instructed to execute the NC program 34 at a time in a next control cycle T1 ((2) execution start of NC program).

Then, as a task with a low priority, the NC program 34 is sequentially interpreted for each application cycle T2. For example, a code of the first row of the NC Program 34 illustrated in FIG. 7 is interpreted in a first application cycle T2, and a code of the second row of the NC program 34 illustrated in FIG. 7 is interpreted in a second application cycle T2 ((3) execution).

For the purpose of convenience of description, an example in which interpretation of the code corresponding to one row is performed in the first application cycle T2 has been described, but codes of a plurality of rows may be interpreted in the first application cycle T2, which is a normal type.

Thereafter, when a code of the third row (that is, the special code 342 illustrated in FIG. 7) of the NC program 34 is executed, an execution interruption variable which is an example of the shared variable stored in the shared memory 20 is set ((4) setting of execution interruption variable). That is, the interpreter 162 writes the execution interruption variable (the second shared variable value) which is referred to in the course of program execution to the shared memory 20 in accordance with the codes described in the NC program 34. The time at which the execution interruption variable is set corresponds to the application cycle T2.

Creation of the CNC instruction value 170 by an intermediate code created on the basis of the code of the second row immediately before the code of the third row is performed as a task with a high priority over a plurality of control cycles T1. Accordingly, when the special code 342 is executed and the CNC instruction value 170 based on the code of the second row immediately before continues to be created, the execution interruption variable is set immediately after creation of the CNC instruction value 170 has been completed.

When the execution interruption variable is set, change of the value of the execution interruption variable in the sequence program 30 which is periodically executed is detected ((5) detection of execution interruption variable). In a task with a high priority, a process which is started on the premise that the value of the execution interruption variable has changed is performed ((6) execution of necessary process). When such a process has been completely performed, the execution interruption variable which is an example of the shared variable stored in the shared memory 20 is reset ((7) resetting of execution interruption variable).

The data synchronizing process between the sequence program executing unit 150, the numerical control program executing unit 160, and the shared memory 20 is performed for each application cycle T2 in response to completion of the processing of the interpreter 162. Accordingly, even when the sequence program executing unit 150 outputs a reset command in a certain control cycle T1, the execution interruption variable in the shared memory 20 cannot be said to be reset in the control cycle T1. This is a type of exclusive operation of prohibiting change of the execution interruption variable in the middle of the processing of the interpreter 162.

After the execution interruption variable has been set and after the execution interruption variable has been reset, the NC program 34 in a task with a low priority is in an execution completion waiting state.

When the execution interruption variable is reset, sequential execution of the codes of the NC program 34 is restarted for each application cycle T2 ((8) execution). That is, sequential execution of codes of the fourth row and rows subsequent thereto in the NC program 34 is started.

Cooperative control of the sequence program 30 and the NC program 34 can be implemented by the replacement of a task with a low priority and a task with a high priority.

In the timing chart illustrated in FIG. 8, an example in which the sequential interpretation of the NC program 34 by the interpreter 162 is in a standby state when the special code 342 for controlling execution of the NC program 34 is interpreted has been described, but the implementation is not limited thereto. For example, an intermediate code including a normal code for creating a normal CNC instruction value 170 and a special code 342 may be created. In this case, by changing the value of the execution interruption variable which is a shared variable at the level of the intermediate code, the cooperative control of the sequence program 30 and the NC program 34 may be implemented.

<H. Process Routine>

An example of a program executing operation in the control device 100 according to the embodiment will be described below.

Figure 9:
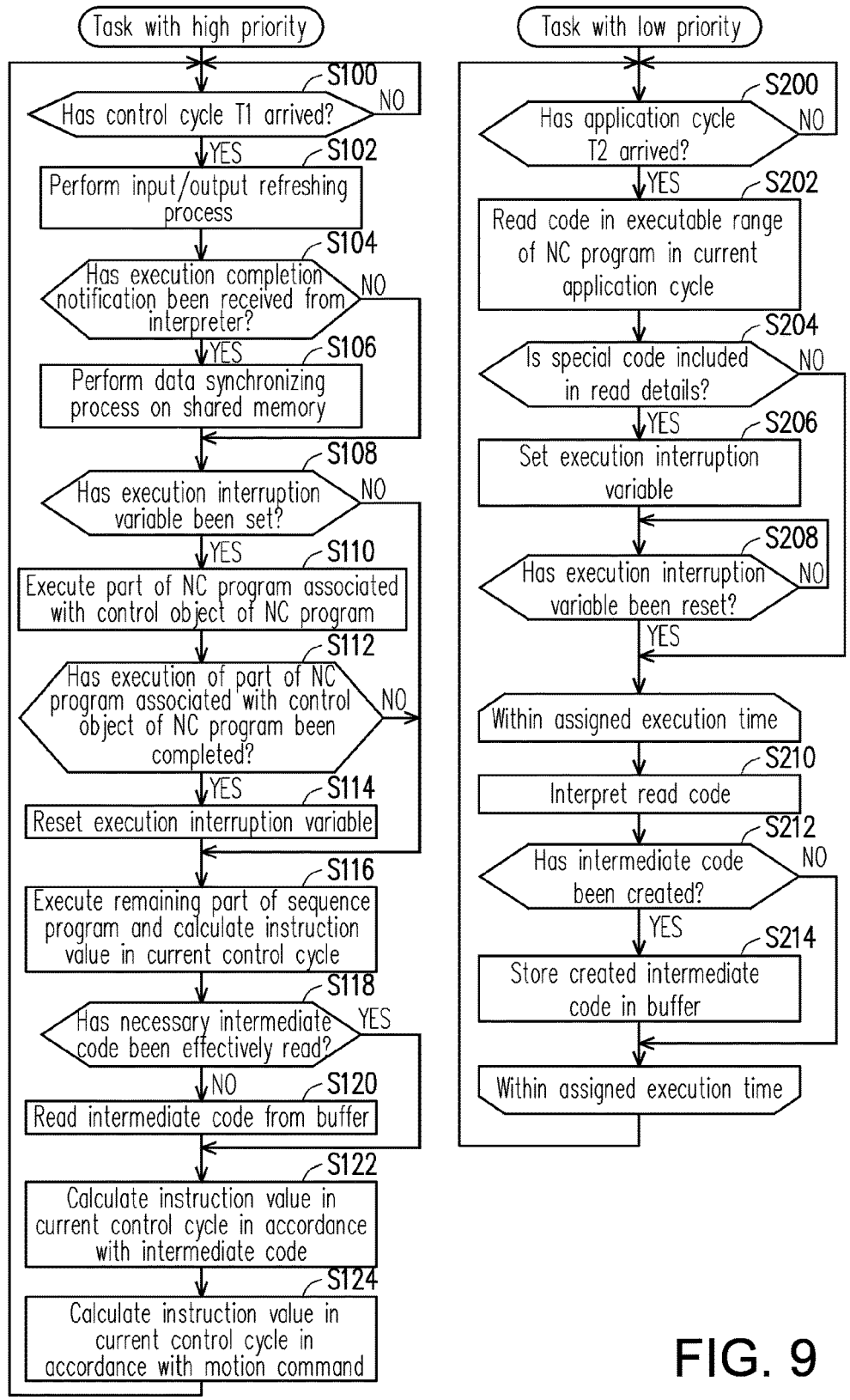
FIG. 9 is a flowchart illustrating a process routine associated with cooperative execution of a sequence program and an NC program in the control device according to the embodiment.

FIG. 9 is a flowchart illustrating a process routine associated with cooperative execution of the sequence program 30 and the NC program 34 in the control device 100 according to the embodiment. Execution of a task with a high priority and execution of a task with a low priority are illustrated in FIG. 9.

Referring to FIG. 9, regarding a task with a high priority, when a control cycle T1 arrives (YES in Step S100), an input/output refreshing process is performed (Step S102). Accordingly, an instruction value calculated in a previous control cycle is output to an actuator or the like and input data is acquired from a field.

Subsequently, the sequence program executing unit 150 (or the NC program executing unit 160) determines whether an execution completion notification has been received from the interpreter 162 (Step S104). When an execution completion notification has been received from the interpreter 162 (YES in Step S104), the data synchronizing process 188 is performed on the sequence program executing unit 150, the NC program executing unit 160, and the shared memory 20 (Step S106). When an execution completion notification has not been received from the interpreter 162 (NO in Step S104), the process of Step S106 is skipped.

Subsequently, the sequence program executing unit 150 determines whether an execution interruption variable stored in the shared memory has been set (Step S108). When an execution interruption variable stored in the shared memory 20 has been set (YES in Step S108), the sequence program executing unit 150 executes a part of the NC program 34 which is prescribed in association with a control object of the NC Program 34 and calculates an instruction value in a current control cycle (Step S110).

Subsequently, when execution of the part of the NC program 34 which is prescribed in association with a control object of the NC Program 34 has been completed (YES in Step S112), the sequence program executing unit 150 resets the execution interruption variable (Step S114). When execution of the part of the NC program 34 which is prescribed in association with a control object of the NC Program 34 has not been completed (NO in Step S112), the process of Step S114 is skipped.

When an execution interruption variable stored in the shared memory 20 has not been set (NO in Step S108), all of steps S110 to S114 are skipped.

The sequence program executing unit 150 executes a part other than the part of the sequence program 30 which is executed in Step S110 and calculates an instruction value in the current control cycle (Step S116).

The CNC instruction value calculating unit 168 of the NC program executing unit 160 determines whether an intermediate code required for calculating an instruction value has been effectively read (Step S118). When the intermediate code has not been effectively read (NO in Step S118), the CNC instruction value calculating unit 168 reads the intermediate code from the intermediate code buffer 164 (Step S120). When the intermediate code has been effectively read (YES in Step S118), the process of Step S120 is skipped.

The CNC instruction value calculating unit 168 of the numerical control program executing unit 160 calculates an instruction value in the current control cycle in accordance with the intermediate code (Step S122).

The sequence command processing unit 152 of the sequence program executing unit 150 calculates an instruction value in the current control cycle in accordance with a motion command included in the sequence program 30 (Step S124).

The processes of Steps S108 to S114 may be interrupted in the middle of execution of the sequence program 30 in Step S116.

Through the above-mentioned process routine, the instruction values in the current control cycle are calculated. Then, the processes of Step S100 and steps subsequent thereto are repeated. That is, when a next control cycle arrives, the instruction values calculated in Steps S110, S116, S122, and S124 are output to a field. In the period after Step S124 and until a next control cycle arrives, a task with a low priority is executed.

On the other hand, regarding a task with a low priority, when an application cycle T2 arrives (YES in Step S200), the interpreter 162 of the NC program executing unit 160 reads a code within a range in which the NC Program 34 is executable in the current application cycle (Step S202). The interpreter 162 determines whether a special code for instructing stop of execution is included in the read details (Step S204). When the special code for instructing stop of execution is included in the read details (YES in Step S204), the interpreter 162 sets the execution interruption variable (Step S206). Then, the interpreter 162 waits until the execution interruption variable is reset (Step S208).

When the special code for instructing interruption of execution is not included in the read details (NO in Step S204), the processes of Steps S206 and S208 are skipped.

Then, in a period in which a program execution time is assigned for a task with a low priority, the interpreter 162 interprets the code read in Step S202 (Step S210), and stores a created intermediate code in the intermediate code buffer 164 (Step S214) when the intermediate code has been created (YES in Step S212). Then, the processes of Step S200 and steps subsequent thereto are repeated.

<K. Modified Example>

In the above description, the control device 100 that executes a sequence program 30 and an NC program 34 has been described, but the same can be applied to any program as long as it is a program which is described in an interpreter manner.

<J. Supplementary Note>

The above-mentioned embodiment includes the following technical concepts.

[Configuration 1]

A control device including:

a first program executing unit (10; 150) that executes a sequence program (30) for each first control cycle (T1) and calculates a first instruction value;

a second program executing unit (12; 160) that executes an application program (32; 34) which is described in codes which are sequentially interpreted and calculates a second instruction value for each first control cycle; and a shared memory (20) configured to be accessible by both the first program executing unit and the second program executing unit, wherein the first program executing unit writes the first instruction value (14) and a first shared variable value (18) which is used in the course of execution of a program to the shared memory in accordance with a command included in the sequence program, and wherein the second program executing unit executes the application program while referring to the first shared variable value stored in the shared memory in accordance with the codes described in the application program.

[Configuration 2]

The control device according to Configuration 1, wherein second program executing unit includes:

an interpreter (162) that sequentially interprets the application program and creates an intermediate code for each second control cycle (T2) which is an integer multiple of the first control cycle; and an instruction value calculating unit (168) that calculates the second instruction value for each first control cycle in accordance with the intermediate code created by the interpreter, and wherein a data synchronizing process (188) is performed between the first program executing unit, the second program executing unit, and the shared memory for each second control cycle in response to processing completion of the interpreter.

[Configuration 3]

The control device according to Configuration 2, wherein the data synchronizing process is performed in a next first control cycle after the processing completion of the interpreter.

[Configuration 4]

The control device according to Configuration 3, wherein the first program executing unit executes the sequence program while referring to a value stored in the shared memory.

[Configuration 5]

The control device according to Configuration 3 or 4, wherein the interpreter writes a second shared variable value which is referred to in the course of execution of a program to the shared memory in accordance with the codes described in the application program, and wherein the codes described in the application program include a special code (342) for waiting for update of the second shared variable value by the first program executing unit after the second shared variable value has been updated.

[Configuration 6]

The control device according to Configuration 5, wherein the special code is defined in advance in a language form for describing the application program.

[Configuration 7]

The control device according to any one of Configurations 2 to 6, wherein the interpreter performs processing in a period in which none of the first program executing unit and the instruction value calculating unit performs processing.

[Configuration 8]

The control device according to any one of configurations 1 to 7, wherein the application program is a numerical control program which is described in a predetermined language.

[Configuration 9]

A control method of a control device, including:

a step (S100 to S120) of executing a sequence program for each first control cycle and calculating a first instruction value; and a step (S200 to S216) of executing an application program which is described in codes which are sequentially interpreted and calculating a second instruction value for each first control cycle, wherein the control device includes a shared memory (20) configured to be accessible by both an execution entity of the sequence program and an execution entity of the application program, wherein the step of calculating the first instruction value includes a step (S110) of writing a first shared variable value which is used in the course of execution of a program to the shared memory in accordance with a command included in the sequence program, and wherein the step of calculating the second instruction value includes a step (S206 to S210) of executing the application program while referring to the first shared variable value stored in the shared memory in accordance with the codes described in the application program.

A system in which a control device such as a PLC and a CNC controller are combined has been employed when a machine tool or the like is controlled in the related art. In such a system, a cooperative operation is implemented by communication or wire connection between the controllers. However, in the PLC and the CNC controller, since programs are executed in independent cycles and the programs are synchronized with each other by communication or wire connection between the controllers, an unnecessary waiting time for waiting for communication processing between the programs is caused and thus redundant interlocking measures or the like are required.

On the other hand, in the embodiment, a sequence program and an application program can be executed in parallel by a single control device, and arbitrary values can be transmitted and received between the programs using a shared memory. By employing this configuration, since the redundant interlocking measures are not necessary and values can be directly transmitted and received, it is possible to minimize the waiting time between the programs.

In the control device according to the embodiment, a task of an application can be interrupted at an arbitrary position using a characteristic technique of an application program (for example, the above-mentioned special code).

In the control device according to the embodiment, since behavior of an application program can be controlled in an execution cycle (a control cycle) of a sequence program, it is possible to implement cooperative execution with higher accuracy.

The above-disclosed embodiments should be understood to be merely exemplary, but not restrictive in all aspects. The scope of the disclosure is defined by the appended claims, not by the above description, and is intended to include all modifications within meanings and scopes equivalent to the scope of the claims.

What is claimed is:

1. A control device comprising:
    a first program executing unit that executes a sequence program for each first control cycle and calculates a first instruction value;
    a second program executing unit that executes an application program which is described in codes which are sequentially interpreted and calculates a second instruction value for each first control cycle; and
    a shared memory configured to be accessible by both the first program executing unit and the second program executing unit,
    wherein the first program executing unit writes a first shared variable value which is used in the course of execution of a program to the shared memory in accordance with a command included in the sequence program, and
    wherein the second program executing unit executes the application program while referring to the first shared variable value stored in the shared memory in accordance with the codes described in the application program,
    wherein the second program executing unit includes:
        an interpreter that sequentially interprets the application program and creates an intermediate code for each second control cycle which is an integer multiple of the first control cycle; and
        an instruction value calculating unit that calculates the second instruction value for each first control cycle in accordance with the intermediate code created by the interpreter,
    wherein a data synchronizing process is performed between the first program executing unit, the second program executing unit, and the shared memory for each second control cycle in response to completion of processing by the interpreter.

2. The control device according to claim 1, wherein the data synchronizing process is performed in a next first control cycle after the completion of processing by the interpreter.

3. The control device according to claim 2, wherein the first program executing unit executes the sequence program while referring to a value stored in the shared memory.

4. The control device according to claim 2, wherein the interpreter writes a second shared variable value which is referred to in the course of execution of a program to the shared memory in accordance with the codes described in the application program, and
wherein the codes described in the application program include a special code for waiting for update of the second shared variable value by the first program executing unit after the second shared variable value has been updated.

5. The control device according to claim 3, wherein the interpreter writes a second shared variable value which is referred to in the course of execution of a program to the shared memory in accordance with the codes described in the application program, and
wherein the codes described in the application program include a special code for waiting for update of the second shared variable value by the first program executing unit after the second shared variable value has been updated.

6. The control device according to claim 4, wherein the special code is defined in advance in a language form for describing the application program.

7. The control device according to claim 1, wherein the interpreter performs processing in a period in which none of the first program executing unit and the instruction value calculating unit performs processing.

8. The control device according to claim 2, wherein the interpreter performs processing in a period in which none of the first program executing unit and the instruction value calculating unit performs processing.

9. The control device according to claim 3, wherein the interpreter performs processing in a period in which none of the first program executing unit and the instruction value calculating unit performs processing.

10. The control device according to claim 4, wherein the interpreter performs processing in a period in which none of the first program executing unit and the instruction value calculating unit performs processing.

11. The control device according to claim 6, wherein the interpreter performs processing in a period in which none of the first program executing unit and the instruction value calculating unit performs processing.

12. The control device according to claim 1, wherein the application program is a numerical control program which is described in a predetermined language.

13. The control device according to claim 1, wherein the application program is a numerical control program which is described in a predetermined language.

14. The control device according to claim 2, wherein the application program is a numerical control program which is described in a predetermined language.

15. The control device according to claim 3, wherein the application program is a numerical control program which is described in a predetermined language.

16. The control device according to claim 4, wherein the application program is a numerical control program which is described in a predetermined language.

17. The control device according to claim 6, wherein the application program is a numerical control program which is described in a predetermined language.

18. The control device according to claim 7, wherein the application program is a numerical control program which is described in a predetermined language.

19. A control method of a control device, comprising:
a step of executing a sequence program for each first control cycle and calculating a first instruction value; and
a step of executing an application program which is described in codes which are sequentially interpreted and calculating a second instruction value for each first control cycle,
wherein the control device includes a shared memory configured to be accessible by both an execution entity of the sequence program and an execution entity of the application program,
wherein the step of calculating the first instruction value includes a step of writing a first shared variable value which is used in the course of execution of a program to the shared memory in accordance with a command included in the sequence program, and
wherein the step of calculating the second instruction value includes:
a step of executing the application program while referring to the first shared variable value stored in the shared memory in accordance with the code described in the application program;
an interpreting step of sequentially interpreting the application program and creating an intermediate code for each second control cycle which is an integer multiple of the first control cycle; and
a step of calculating the second instruction value for each first control cycle in accordance with the intermediate code created by the interpreting step,
wherein a data synchronizing process is performed between the execution entity of the sequence program, the execution entity of the application program, and the shared memory for each second control cycle in response to completion of processing by the interpreting step.

* * * * *